United States Patent
Seidel

(10) Patent No.: US 9,926,232 B2
(45) Date of Patent: Mar. 27, 2018

(54) PROCESS FOR PRODUCING WATER-REDISPERSIBLE POLYMER POWDER COMPOSITIONS HAVING CATIONIC FUNCTIONALITY

(71) Applicant: Wacker Chemie AG, Munich (DE)

(72) Inventor: Jessica Seidel, Zangberg (DE)

(73) Assignee: WACKER CHEMIE AG, Munich (DE)

(*) Notice: Subject to any disclaimer, the term of this patent is extended or adjusted under 35 U.S.C. 154(b) by 24 days.

(21) Appl. No.: 15/035,870

(22) PCT Filed: Oct. 30, 2014

(86) PCT No.: PCT/EP2014/073364
§ 371 (c)(1),
(2) Date: May 11, 2016

(87) PCT Pub. No.: WO2015/071108
PCT Pub. Date: May 21, 2015

(65) Prior Publication Data
US 2016/0280599 A1  Sep. 29, 2016

(30) Foreign Application Priority Data
Nov. 15, 2013  (DE) ......... 10 2013 223 305

(51) Int. Cl.
| | |
|---|---|
| *C04B 24/26* | (2006.01) |
| *C08F 2/20* | (2006.01) |
| *C08F 218/08* | (2006.01) |
| *C04B 28/04* | (2006.01) |
| *C04B 40/00* | (2006.01) |
| *C04B 14/06* | (2006.01) |
| *C04B 24/38* | (2006.01) |
| *C04B 103/00* | (2006.01) |
| *C04B 111/00* | (2006.01) |
| *C04B 111/27* | (2006.01) |
| *C04B 111/60* | (2006.01) |
| *C04B 111/62* | (2006.01) |
| *C04B 111/70* | (2006.01) |

(52) U.S. Cl.
CPC .......... *C04B 24/2623* (2013.01); *C04B 14/06* (2013.01); *C04B 24/383* (2013.01); *C04B 28/04* (2013.01); *C04B 40/0042* (2013.01); *C08F 2/20* (2013.01); *C08F 218/08* (2013.01); *C04B 2103/0054* (2013.01); *C04B 2103/0063* (2013.01); *C04B 2111/00508* (2013.01); *C04B 2111/00637* (2013.01); *C04B 2111/00672* (2013.01); *C04B 2111/27* (2013.01); *C04B 2111/60* (2013.01); *C04B 2111/62* (2013.01); *C04B 2111/70* (2013.01)

(58) Field of Classification Search
CPC ........ C04B 24/2623; C04B 2103/0054; C04B 28/04; C04B 40/0042; C04B 24/383; C04B 14/06; C08F 218/08
USPC .......................................................... 524/5
See application file for complete search history.

(56) References Cited

U.S. PATENT DOCUMENTS

| | | | |
|---|---|---|---|
| 5,874,524 A | 2/1999 | Pakusch et al. | |
| 6,559,236 B1 | 5/2003 | Willimann et al. | |
| 2009/0030168 A1* | 1/2009 | Schorm .................... | C08F 2/20 526/201 |

FOREIGN PATENT DOCUMENTS

| | | |
|---|---|---|
| DE | 10 2005 050 201 B3 | 4/2007 |
| DE | 102005050201 * | 4/2007 |
| EP | 0 770 640 A2 | 5/1997 |
| WO | 9813411 A1 | 4/1998 |
| WO | 00/05275 A1 | 2/2000 |
| WO | 00/05283 A1 | 2/2000 |
| WO | 2007/093551 A1 | 8/2007 |

OTHER PUBLICATIONS

Translation of DE102005050201, Apr. 26, 2007.*
E.W. Flick, "Water-Soluble Resins"—an Industrial Guide, Second Edition, Noyes Publications, Park Ridge, N.J. (1991), 20 pages.
Fox, T.G., Bull. Am. Physics Soc. 1, 3, p. 123 (1956).
Polymer Handbook 2nd Edition, J. Wiley & Sons, New York (1975).

* cited by examiner

*Primary Examiner* — Hui H Chin
(74) *Attorney, Agent, or Firm* — Brooks Kushman P.C.

(57) ABSTRACT

Water-redispersible polymer powder compositions having cationic functionality are prepared by radically polymerizing one or more ethylenically unsaturated monomers in the presence of a protective colloid and/or emulsifier in an aqueous medium, and drying the resulting aqueous polymer dispersion after addition of a catonic protective colloid as a drying aid, the cationic protective colloid comprising a homopolymer or copolymer of one or more cationic monomers having a quaternary ammonium halide group, with 50 wt % to 100 wt % of the halide ions in the quaternary ammonium halide groups having been replaced by nonhalide anions, and with the fraction of halide ions being less than 1 wt %, based on the total weight of the polymer powder composition.

13 Claims, No Drawings

US 9,926,232 B2

PROCESS FOR PRODUCING WATER-REDISPERSIBLE POLYMER POWDER COMPOSITIONS HAVING CATIONIC FUNCTIONALITY

CROSS REFERENCE TO RELATED APPLICATIONS

This application is the U.S. National Phase of PCT Appln. No. PCT/EP2014/073364 filed Oct. 30, 2014, which claims priority to German Application No. 10 2013 223 305.1 filed Nov. 15, 2013, the disclosures of which are incorporated in their entirety by reference herein.

BACKGROUND OF THE INVENTION

1. Field of the Invention

The invention relates to a process for producing water-redispersible polymer powder compositions having cationic functionality, to water-redispersible polymer powder compositions having cationic functionality that are obtainable by the process, and to the use thereof.

2. Description of the Preferred Embodiments

Water-redispersible polymer powders (dispersion powders) are polymer powders which are obtained in general by drying of the corresponding aqueous polymer dispersions, in the presence of a drying aid (generally a protective colloid). One of the effects of the protective colloid fraction is to prevent the polymer particles from undergoing irreversible bonding during the drying operation, because the polymer particles are enveloped by the water-soluble particles of protective colloid. A second effect of this protective colloid matrix, which dissolves again when the polymer powder is dispersed in water, is that in the aqueous redispersion, the polymer particles are present again with the particle size of the original dispersion.

Dispersion powders of this kind are used especially in chemical construction products, such as in dry mortar formulations, for example, which are made ready for use by addition of water. The addition of the dispersion powders improves the processing properties of the mortars and leads to higher mechanical strength in the set mortars.

From the prior art it is already known that protective colloids having cationic functionality are among those which can be used for producing water-redispersible polymer powders.

WO 00/05275 A1 discloses a process in which cationic monomers are polymerized in an aqueous medium and, in the presence of the polymer formed in situ in this case, further monomers are polymerized. The polymer dispersion accordingly obtained accordingly is then spray-dried in the presence of polyvinyl alcohol. A process analogous to this is described in WO 00/05283 A1, the process in this case being controlled in such a way as to form copolymer particles having heterogeneous morphology.

EP 0770640 A2 describes a process for producing dispersion powders by the drying of an aqueous polymer dispersion. A key point there is that the polymer particles in dispersion in water have a positive or negative surface charge and are dried with a drying assistant whose charge is opposite to the charge of the polymer particles in the aqueous polymer dispersion.

WO 98/13411 A1 describes the production of polymer powders by spray drying of an emulsion polymer which has anionic groups, with an amphoteric polymer of natural origin (polysaccharides, preferably casein, gelatin, and proteins) or of synthetic type (copolymers of acrylic esters and unsaturated carboxylic acids with tertiary or quaternary ammonium groups in the side chain).

WO 2007/093551 A1 describes water-redispersible polymer powders which are obtained by drying a polymer dispersion in the presence of a cationic protective colloid as drying aid. Cationic protective colloids used are polymers of monomers having quaternary ammonium groups and a halide counterion, more particularly a chloride ion. In comparison with dispersion powders dried using polyvinyl alcohol as drying aid, these powders are distinguished by better processing properties in the production of mortar compounds. The mechanical strength of the mortar compounds obtained accordingly is nevertheless deserving of improvement.

SUMMARY OF THE INVENTION

An object of the invention was therefore to develop a cationic polymer powder composition having improved mechanical properties in construction materials modified therewith, for which water-soluble cationic protective colloids can be used without restriction. These and other objects are achieved by radically polymerizing one or more ethylenically unsaturated monomers in the presence of protective colloid and/or emulsifier in an aqueous medium, and drying the resulting aqueous polymer dispersion after addition of a catonic protective colloid as drying aid, characterized in that said cationic protective colloid used comprises homopolymers or copolymers of one or more cationic monomers having a quaternary ammonium halide group, with 50 wt % to 100 wt % of the halide ions in the quaternary ammonium halide groups having been replaced by nonhalide anions, and with the fraction of halide ions being less than 1 wt %, based on the total weight of the polymer powder composition.

DETAILED DESCRIPTION OF THE PREFERRED EMBODIMENTS

The invention thus provides a process for producing water-redispersible polymer powder compositions having cationic functionality, by radically polymerizing one or more ethylenically unsaturated monomers in the presence of protective colloid and/or emulsifier in an aqueous medium, and drying the resulting aqueous polymer dispersion after addition of a catonic protective colloid as drying aid, characterized in that said cationic protective colloid used comprises homopolymers or copolymers of one or more cationic monomers having a quaternary ammonium halide group, with 50 wt % to 100 wt % of the halide ions in the quaternary ammonium halide groups having been replaced by nonhalide anions, and with the fraction of halide ions being less than 1 wt %, based on the total weight of the polymer powder composition.

The cationic protective colloids used in this process, based on homopolymers or copolymers of one or more cationic monomers having a quaternary ammonium halide group, in which 50 wt % to 100 wt % of halide ions in the quaternary ammonium groups have been replaced by nonhalide anions, and for whose use as a drying aid the fraction of halide ions is less than 1 wt % based on the total weight of the polymer powder composition, are also referred to below as low-halide cationic protective colloids.

Cationic protective colloids suitable for producing the low-halide cationic protective colloids are described in, for example, E. W. Flick, Water-Soluble Resins—an Industrial Guide, Noyes Publications, Park Ridge, N.J., 1991. Preference is given to homopolymers or copolymers of one or more cationic monomers from the group encompassing diallyldimethylammonium chloride (DADMAC), diallyldiethylammonium chloride (DADEAC), (3-methacryloyloxy)propyltrimethylammonium chloride (MPTAC), (2-methacryloyloxy)ethyltrimethylammonium chloride (METAC), (3-methacrylamido)propyltrimethylammonium chloride (MAPTAC).

In general the cationic protective colloids comprise 10 to 100 wt %, preferably 50 to 100 wt %, more preferably 60 to 100 wt %, more preferably 90 to 100 wt %, and most preferably about 100 wt %, of monomer units having a quaternary ammonium group, based on the total weight of the cationic protective colloid. Suitable nonionic, copolymerizable monomers are vinyl esters having 1 to 15 C atoms in the carboxylic acid radical, such as vinyl acetate, vinyl propionate, vinyl dodecanoate; acrylamide; hydroxyethyl (meth)acrylate, hydroxypropyl (meth)acrylate; esters of methacrylic acid and acrylic acid with alcohols having 4 to 13 C atoms, polyalkylene glycol (meth)acrylates having $C_2$ to $C_4$ alkylene units and molecular weights of 350 to 2000 g/mol, and also N-vinylpyrrolidone, N-vinylcaprolactam, acryloyloxypropyltrialkoxy- and methacryloyloxypropyltrialkoxysilanes such as methacryloyloxypropyltrimethoxysilane; vinyltrialkoxysilanes such as vinyltrimethoxysilane or vinyltriethoxysilane; and vinylmethyldialkoxysilanes such as vinylmethyldimethoxysilane; and/or mixtures of the stated nonionic comonomers.

The cationic protective colloids having quaternary ammonium groups may be prepared by polymerization processes known to the skilled person, as for example by free radical polymerization in aqueous solution, in solvent mixtures, or in the presence of salts, including, for example, in precipitation polymerization, in suspension, for example, or by inverse emulsion polymerization, for example. The initiators in these cases may be water-soluble or oil-soluble and may come from the group of the persulfates, peroxides, azo compounds and also the oxidation/reduction initiator pairs. Especially with the latter method of inverse emulsion polymerization or water-in-oil polymerization, extremely high-molecular-weight cationic polymers are achieved with molecular weights of >5,000,000 g/mol.

The most preferred preparation is that by solution polymerization in water with low solids contents (preferably ≤40 wt %) in the presence of water-soluble initiators such as azo initiators or redox initiators, optionally in the presence of chain transfer agents such as mercaptopropionic acid or 2-mercaptoethanol.

Cationic protective colloids suitable for preparing the low-halide cationic protective colloids are also available commercially. For example, polydiallyldimethylammonium chloride (poly-DADMAC) is offered as Catiofast BP (BASF) or Superfloc® C-592 (Kemira, Water Solutions B.V).

In order to prepare the low-halide, cationic protective colloids, it is possible for a reduction of halide ions in the cationic protective colloid to take place by means of processes known to the skilled person. For example, by means of the ion exchange processes known from DE 102005050201 B3, such as anion exchange using an anion exchange resin, or membrane filtration processes, more particularly nanofiltration. In the case of the nanofiltration process, the aqueous cationic protective colloid solution is circulated via a nanofiltration membrane, and the polymer-containing retentate is supplied with a nonhalide-containing inorganic salt solution at the same rate at which halide-containing permeate is deposited via the nanofiltration membrane. The halide ion in this case, generally chloride, is replaced by a nonhalide ion, such as sulfate, nitrate, acetate, thiosulfate, or sulfite, for example. The halide ion is preferably replaced by a sulfate or thiosulfate ion. In general, 50 to 100 wt % of the halide ions, preferably 80 to 100 wt % of the halide ions, most preferably 80 to 95 wt % of the halide ions, are replaced, based in each case on the total weight of the halide ions in the cationic protective colloid. The viscosity of the cationic polymer solutions used for the nanofiltration is situated typically in the range from 50 to 400 mPas, preferably in the range from 70 to 150 mPas (Brookfield viscosity according to ISO 2555, 20 rpm, 23° C., with the spindle recommended for the corresponding viscosity range). The viscosity of the cationic polymer solution can be adjusted to the preferred viscosity range by dilution with fully demineralized water.

Monomers suitable for preparing the aqueous polymer dispersion of the film-forming base polymer are vinyl esters of unbranched or branched alkyl carboxylic acids having 1 to 15 C atoms, methacrylic esters and acrylic esters of alcohols having 1 to 15 C atoms, vinylaromatics, olefins, dienes, or vinyl halides.

Preferred vinyl esters are vinyl acetate, vinyl propionate, vinyl butyrate, vinyl-2-ethylhexanoate, vinyl laurate, 1-methylvinyl acetate, vinyl pivalate, and vinyl esters of alpha-branched monocarboxylic acids having 9 to 13 C atoms, as for example VeoVa9® or VeoVa10® (trade names of Momentive). Vinyl acetate is particularly preferred.

Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Particularly preferred are methyl acrylate, methyl methacrylate, n-butyl acrylate, and 2-ethylhexyl acrylate.

Examples of olefins and dienes are ethylene, propylene, and 1,3-butadiene. Suitable vinylaromatics are styrene and vinyltoluene. A preferred vinyl halide is vinyl chloride.

Optionally it is also possible to copolymerize 0.05 to 50 wt %, preferably 1 to 10 wt %, of auxiliary monomers, based on the total weight of the monomers. Examples of auxiliary monomers are ethylenically unsaturated monocarboxylic and dicarboxylic acids, preferably acrylic acid, methacrylic acid, fumaric acid, and maleic acid; ethylenically unsaturated carboxamides and carbonitriles, preferably acrylamide and acrylonitrile; monoesters and diesters of fumaric acid and maleic acid such as the diethyl and diisopropyl esters, and also maleic anhydride, ethylenically unsaturated sulfonic acids and/or salts thereof, preferably vinylsulfonic acid, 2-acryloylamido-2-methylpropane-sulfonic acid. Other examples are precrosslinking comonomers such as polyethylenically unsaturated comonomers, examples being divinyl adipate, diallyl maleate, allyl methacrylate, or triallyl cyanurate, or postcrosslinking comonomers, examples being acryloylamido glycolic acid (AGA), methylacryloylamido glycolic acid methyl ester (MAGME), N-methylolacrylamide (NMA), N-methylolmethacrylamide (NMMA), N-methylolallylcarbamate, alkyl ethers such as the isobutoxy ether or esters of N-methylolacrylamide, of N-methylolmethacrylamide, and of N-methylolallylcarbamate. Also suitable are epoxide-functional comonomers such as glycidyl methacrylate and glycidyl acrylate. Other examples are silicon-functional comonomers, such as acryloyloxypropyltri(alkoxy)- and methacryloyloxypropyltri-(alkoxy)-silanes such as methacryloyloxypropyltrimethoxysilane, vinyltrialkoxysilanes and vinylmethyldialkoxysilanes such as vinyltrimethoxysilane or vinyltriethoxysilane or vinylmethyldimethoxysilane, the alkoxy groups which may be present being, for example, methoxy, ethoxy, and ethoxypropylene glycol ether radicals. Mention may also be made of monomers having hydroxyl groups or CO groups, examples being methacrylic and acrylic acid hydroxyalkyl esters such as hydroxyethyl, hydroxypropyl, or hydroxybutyl acrylate or methacrylate, and also compounds such as diacetoneacrylamide and acetylacetoxyethyl acrylate or methacrylate. Other suitable comonomers are vinyl alkyl ethers, such as vinyl methyl ether, vinyl ethyl ether, vinyl isobutyl ether, vinyl octadecyl ether, for example.

Examples of homopolymers and copolymers suitable as base polymer are vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, and styrene-1,3-butadiene copolymers.

Preference is given to vinyl acetate homopolymers;
copolymers of vinyl acetate with 1 to 40 wt % of ethylene;
copolymers of vinyl acetate with 1 to 40 wt % of ethylene and 1 to 50 wt % of one or more further comonomers from the group of vinyl esters having 1 to 15 C atoms in the carboxylic acid radical such as vinyl propionate, vinyl dodecanoate, vinyl esters of alpha-branched carboxylic acids having 9 to 13 C atoms such as VeoVa9®, VeoVa10®, VeoVa11®;
copolymers of vinyl acetate with 1 to 50 wt % of one or more further comonomers from the group of vinyl esters having 1 to 15 C atoms in the carboxylic acid radical such as vinyl propionate, vinyl dodecanoate, vinyl esters of alpha-branched carboxylic acids having 9 to 13 C atoms such as VeoVa9®, VeoVa10®, VeoVa11®;
copolymers of vinyl acetate, 1 to 40 wt % of ethylene, and preferably 1 to 60 wt % of acrylic esters of unbranched or branched alcohols having 1 to 15 C atoms, more particularly n-butyl acrylate or 2-ethylhexyl acrylate;
copolymers of 30 to 75 wt % of vinyl acetate, 1 to 30 wt % of vinyl laurate or vinyl esters of an alpha-branched carboxylic acid having 9 to 13 C atoms, and also 1 to 30 wt % of acrylic esters of unbranched or branched alcohols having 1 to 15 C atoms, more particularly n-butyl acrylate or 2-ethylhexyl acrylate, which may optionally further comprise 1 to 40 wt % of ethylene;
copolymers of vinyl acetate, 1 to 40 wt % of ethylene, and 1 to 60 wt % of vinyl chloride;
copolymers of one or more vinyl esters having 1 to 12 C atoms in the carboxylic acid radical such as vinyl acetate, vinyl propionate, vinyl laurate, vinyl esters of alpha-branched carboxylic acids having 5 to 13 C atoms such as VeoVa9®, VeoVa10®, VeoVa11®, 1 to 40 wt % of ethylene, and 1 to 60 wt % of vinyl chloride;
where in each case the stated auxiliary monomers may also be copolymerized in the stated quantities, and where the amounts in wt % add up to 100 wt % in each case.

Preference is also given to (meth)acrylic ester polymers, such as copolymers of n-butyl acrylate or 2-ethylhexyl acrylate or copolymers of methyl methacrylate with n-butyl acrylate and/or 2-ethylhexyl acrylate and optionally ethylene;
styrene-(meth)acrylic ester copolymers of one or more monomers from the group of methyl acrylate, ethyl acrylate, propyl acrylate, n-butyl acrylate, 2-ethylhexyl acrylate; vinyl acetate-(meth)acrylic ester copolymers of one or more monomers from the group of methyl acrylate, ethyl acrylate, propyl acrylate, n-butyl acrylate, 2-ethylhexyl acrylate, and optionally ethylene;
copolymers of styrene and 1,3-butadiene;
where in each case the stated auxiliary monomers may also be copolymerized in the stated amounts, and where the figures in wt % add up to 100 wt % in each case.

The monomer selection, or the selection of the weight fractions of the comonomers, is made such that in general the resulting glass transition temperature Tg is from −50° C. to +50° C., preferably −30° C. to +10° C. The glass transition temperature Tg of the polymers can be determined in a known way by means of differential scanning calorimetry (DSC). The Tg may also be calculated approximately in advance using the Fox equation. According to Fox T. G., Bull. Am. Physics Soc. 1, 3, page 123(1956), the following is true:

$1/Tg = x_1/Tg_1 + x_2/Tg_2 + \ldots + x_n/Tg_n$, where $x_n$ stands for the mass fraction (wt %/100) of the monomer n, and $Tg_n$ is the glass transition temperature, in Kelvins, of the homopolymer of the monomer n. Tg values for homopolymers are listed in Polymer Handbook 2nd edition, J. Wiley & Sons, New York (1975).

The homopolymers and copolymers are prepared preferably by the emulsion polymerization process, with the polymerization temperature being generally, but not necessarily, <100° C.

Independently of the polymerization process, the polymerization may be carried out with or without the use of seed latices, with all or certain constituents of the reaction mixture being included in the initial charge, or with partial inclusion in the initial charge and partial subsequent metering of the constituent or of individual constituents of the reaction mixture, or by the metering method without an initial charge. The comonomers may all be included in the initial charge for preparing the dispersion (batch process), or a portion of the monomers is included in the initial charge and the remainder is metered in (semibatch process).

The polymerization is initiated using the water-soluble initiators or redox initiator combinations that are customary for emulsion polymerization. Examples of water-soluble initiators are the sodium, potassium, and ammonium salts of peroxodisulfuric acid, hydrogen peroxide, tert-butylhydroperoxide, potassium peroxodiphosphate, cumene hydroperoxide, isopropylbenzene monohydroperoxide. The stated initiators are used generally in an amount of 0.001 to 0.02 wt %, preferably 0.001 to 0.01 wt %, based in each case on the total weight of the monomers. Redox initiators used are combinations of the stated initiators in combination with reducing agents. Suitable reducing agents are the sulfites and bisulfites of the alkali metals and of ammonium, sodium sulfite for example, the derivatives of sulfoxylic acid such as zinc or alkali metal formaldehyde-sulfoxylates, sodium hydroxymethanesulfinate for example, ascorbic acid, and mixtures of the salts of 2-hydroxy-2-sulfinatoacetic acid and 2-hydroxy-2-sulfonatoacetic acid with sodium sulfite. The amount of reducing agent is generally 0.001 to 0.03 wt %, preferably 0.001 to 0.015 wt %, based in each case on the total weight of the monomers.

In order to regulate the molecular weight it is possible to add chain transfer agents during the polymerization. If such agents are used, they are customarily employed in amounts between 0.01 to 5.0 wt %, based on the monomers to be polymerized, and are added separately or else as a premix with reaction components. Examples of such agents are n-dodecyl mercaptan, tert-dodecyl mercaptan, mercaptopropionic acid, methyl mercaptopropionate, isopropanol, and acetaldehyde.

The polymerization preferably takes place in the presence of a nonionic protective colloid. Suitable nonionic protective colloids are polyvinyl alcohols, polyvinyl acetals, polyvinylpyrrolidones, polysaccharides in water-soluble form such as starches (amylase and amylopectin), celluloses and their methyl, hydroxyethyl and/or hydroxypropyl derivatives, and poly(meth)acrylamide.

Preference is given to partly hydrolyzed or fully hydrolyzed polyvinyl alcohols having a degree of hydrolysis of 80 to 100 mol %, more preferably to partly hydrolyzed polyvinyl alcohols having a degree of hydrolysis of 80 to 95 mol % and a Höppler viscosity, in 4% strength aqueous solution, of 1 to 30 mPas (Höppler method at 20° C., DIN 53015). Preference is also given to partly hydrolyzed, hydrophobically modified polyvinyl alcohols having a degree of hydrolysis of 80 to 95 mol % and a Höppler viscosity, in 4% strength aqueous solution, of 1 to 30 mPas. Examples thereof are partly hydrolyzed copolymers of vinyl acetate with hydrophobic comonomers such as isopropenyl acetate, vinyl pivalate, vinyl ethylhexanoate, vinyl esters of saturated, alpha-branched monocarboxylic acids having 5 or 9 to 13 C atoms, dialkyl maleates and dialkyl fumarates such as diisopropyl maleate and diisopropyl fumarate, vinyl chloride, vinyl alkyl ethers such as vinyl butyl ether, and olefins such as ethene and decene. The fraction of the hydrophobic units is preferably 0.1 to 10 wt %, based on the total weight of the partly hydrolyzed polyvinyl alcohol. Mixtures of these polyvinyl alcohols may also be used.

Most preferred are partly hydrolyzed polyvinyl alcohols having a degree of hydrolysis of 85 to 94 mol % and a Höppler viscosity, in 4% strength of aqueous solution, of 3 to 15 mPas (Höppler method at 20° C., DIN 53015). The stated protective colloids are obtainable by means of methods known to the skilled person, and are added generally in an amount of in total 1 to 20 wt %, based on the total weight of the monomers, in the polymerization.

It is also possible optionally to use mixtures with one or more nonionic protective colloids and with one or more low-halide, cationic protective colloids, in which case the low-halide cationic protective colloids identified as drying aids can be used.

The polymerization can also be carried out in the presence of a nonionic emulsifier, or in the presence of the stated nonionic protective colloids in combination with a nonionic emulsifier, or in the presence of the stated nonionic protective colloids in a combination with nonionic emulsifier(s) and low-halide cationic protective colloid.

Suitable nonionic emulsifiers are surfactants such as alkyl polyglycol ethers or alkylaryl polyglycol ethers having 8 to 40 alkylene oxide units. Preference is given to alkoxylated $C_8$ to $C_{16}$ alkanols, alkoxylated with $C_2$ to $C_4$ alkylene oxides, more particularly with ethylene oxide and propylene oxide or mixtures thereof. The nonionic emulsifiers are added generally in an amount of 0.05 to 10 wt %, based on the total weight of the monomers, in the polymerization.

It is preferred for only nonionic protective colloids and/or nonionic emulsifiers to be used during the polymerization.

After the end of the polymerization, residual monomer(s) may be removed by postpolymerization using known techniques, generally by postpolymerization initiated with redox catalyst. Volatile residual monomers may also be removed by distillation, preferably under reduced pressure, and optionally with air or steam or inert entraining gases such as nitrogen being passed through or over the polymerization batch. The aqueous dispersions obtainable accordingly have a solids content of 30 to 75 wt %, preferably of 50 to 60 wt %.

To produce the water-redispersible polymer powders with cationic functionality, the aqueous polymer dispersions are dried following addition of the low-halide, cationic protective colloids as drying aids. The low-halide cationic protective colloid here may also be used in combination with nonionic protective colloid. Nonionic protective colloids suitable for this purpose are those already specified above as suitable nonionic protective colloids in the polymerization. In a combination of this kind, the nonionic protective colloid used preferably comprises partly hydrolyzed polyvinyl alcohol having a degree of hydrolysis of 80 to 95 mol % and a Höppler viscosity, in 4% strength aqueous solution, of 1 to 30 mPas (Höppler method at 20° C., DIN 53015), more preferably partly hydrolyzed polyvinyl alcohol having a degree of hydrolysis of 85 to 94 mol % and a Höppler viscosity, in 4% strength aqueous solution, of 3 to 15 mPas (Höppler method at 20° C., DIN 53015). The weight ratio in a combination of this kind between low-halide cationic protective colloid and nonionic protective colloid may be from 90:10 to 10:90, preferably from 70:30 to 30:70.

Generally speaking, the drying aid is used in an amount, of in total, 0.1 to 20 wt %, preferably 1 to 7 wt %, based in each case on the polymeric constituents of the dispersion.

The drying is accomplished, for example, by means of fluidized bed drying, freeze drying, or spray drying. Preferably the dispersions are spray-dried. This spray drying takes place in customary spray-drying units, in which atomization may take place with a rotating disk or by means of single-fluid, two-fluid or multifluid nozzles. The exit temperature is generally selected in the range from 45° C. to 120° C., preferably 60° C. to 90° C., depending on the unit and the desired degree of drying.

Having often proven favorable during drying is the presence of up to 2 wt % of antifoam, based on the base polymer. To increase the shelf life by improving the blocking stability, especially in the case of powders with a low glass transition temperature, the resulting powder may be furnished with an antiblocking agent (anticaking agent), preferably at up to 30 wt %, based on the total weight of the polymeric constituents. Examples of antiblocking agents are Ca and/or Mg carbonate, talc, gypsum, silica, kaolins, metakaolins, and silicates with particle sizes preferably in the range from 10 nm to 100 µm.

The viscosity of the mixture for atomization and for drying may be adjusted via the solids content in such a way as to have viscosity of <1000 mPas (Brookfield viscosity at 20 revolutions and 23° C.), preferably <500 mPas, and most preferably <250 mPas. The solids content of the mixture for atomization is prferably >30 wt %, more preferably >40 wt %.

In order to improve the performance properties, further additives may be incorporated before or during or after drying. Further constituents included in preferred embodiments in dispersion powder compositions are, for example, pigments, fillers, foam stabilizers, hydrophobizing agents, and plasticizers.

The water-redispersible polymer powder compositions with cationic functionality that are obtained in accordance with the invention can be used in the fields of application typical for such compositions. Also possible is the use of blends of the dispersion powders having cationic functionality with conventional dispersion powders.

Examples of applications are those in chemical construction products, optionally in conjunction with hydraulically setting binders such as cements (Portland, high-alumina, trass, blast furnace, magnesia, and phosphate cement), gypsum and waterglass, for the production of construction adhesives, especially tile adhesives (high-flex adhesives, for example) and adhesives for exterior insulation and finishing systems, and renders, filling compounds, floor-filling compounds, leveling compounds, grouts, jointing mortars, and paints. Preferred fields of application are grouts and tile adhesives, including, in particular, tile adhesives for wood substrates. Other possible applications come about through use in the adhesives and coatings sector, the latter, for example, for paper and textile.

It has surprisingly been found that the use of these water-redispersible polymer powder compositions having cationic functionality leads to a significant improvement in the mechanical properties, as has been shown for grouts as an example.

EXAMPLES

The starting dispersions and protective colloids used for producing the polymer powders of the invention were those described below.

Preparation of the Low-halide Cationic Protective Colloid (PC1):

Starting material used was Superfloc® C-592 from Kemira, Water Solutions B.V, a 39 wt % strength aqueous solution of polydiallyldimethylammonium chloride, with a chloride content of 22 wt %. The 39 wt % strength aqueous solution was diluted to 10 wt % with fully demineralized water. In order to reduce the chloride ions, a membrane filtration was carried out using a nanofiltration membrane (Semicon, Nitto Denko NTR-7450 HG F4T). In the presence of a 10% strength sodium thiosulfate solution, the aqueous solution was circulated via the aforementioned nanofiltration membrane (retentate) and the amount of permeate removed, in the form of fully demineralized water, was returned to the circuit. The membrane filtration was continued until the chloride content of the polydiallyldimethylammonium chloride had been reduced to 4.4 wt % by replacement of the chloride ions with thiosulfate ions. The fraction of chloride ions was reduced by 80 wt % in this way. Following the ion exchange procedure, the concentration of the retentate was increased to 20 wt %, by removal of permeate only, but fully demineralized water is not returned to the circuit.

Dispersion A:

Aqueous polymer dispersion based on a vinyl acetate-ethylene copolymer, prepared with 6 wt %, based on the total weight of the monomers, of polyvinyl alcohol having a degree of hydrolysis of 88 mol % and a Höppler viscosity for a 4% strength aqueous solution of 4 mPas, with a polymer dispersion solids content of 53% and a Tg of −6° C.

Dispersion B:

Aqueous polymer dispersion based on a vinyl acetate-ethylene-VeoVa10 copolymer, prepared with 5 wt %, based on the total weight of the monomers, of polyvinyl alcohol having a degree of hydrolysis of 88 mol % and a Höppler viscosity for a 4% strength aqueous solution of 4 mPas, with a polymer dispersion solids content of 50% and a Tg of −15° C.

Dispersion C:

Aqueous polymer dispersion based on a vinyl acetate-ethylene copolymer, prepared with 5.5 wt %, based on the total weight of the monomers, of polyvinyl alcohol having a degree of hydrolysis of 88 mol % and a Höppler viscosity for a 4% strength aqueous solution of 4 mPas, and with 0.5 wt % (dry fraction), based on the total weight of the monomers, of protective colloid PC1 with a polymer dispersion solids content of 53% and a Tg of −5° C.

Protective Colloid—PC1:

20% strength aqueous solution of polydiallyldimethylammonium chloride with a chloride ion fraction of 4.4 wt % and with a Höppler viscosity for a 4% strength aqueous solution of 7 mPas.

Protective Colloid—PC2:

Aqueous polyvinyl alcohol solution having a degree of hydrolysis of 88 mol % and a Höppler viscosity for a 4% strength aqueous solution of 4 mPas.

Protective Colloid—PC3:

Aqueous polyvinyl alcohol solution having a degree of hydrolysis of 88 mol % and a Höppler viscosity for a 4% strength aqueous solution of 13 mPas.

Protective Colloid—PC4:

39% strength aqueous solution of polydiallyldimethylammonium chloride with a chloride ion fraction of 22 wt % and with a Höppler viscosity for a 4% strength solution in water of 12.2 mPas (Superfloc® C-592 from Kemira, Water Solutions B.V).

Examples 1 to 6

The initial dispersions A to C were each mixed with protective colloids PC1 to PC3 in accordance with the quantities (dry mass) indicated in table 1, with addition of 0.3 wt % of defoamer (Silfoam 5860 from Wacker Chemie), based on the solid fraction of the dispersion, and the resulting mixtures were stirred for 30 minutes and filtered. No coagulum was formed in any of examples 1 to 6. The mixtures were spray-dried with addition of 15 wt % of antiblocking agent (calcium carbonate, Omyacarb 5GU), based on the solid fraction of the dispersion.

Comparative Example 7

The initial dispersion A was mixed with protective colloid PC4 in the quantities (dry mass) indicated in table 1, with addition of 0.3 wt % of defoamer (Silfoam S860), based on the solid fraction of the dispersion, and the resulting mixture was stirred for 30 minutes and filtered. The mixture was spray-dried with addition of 15 wt % of antiblocking agent (calcium carbonate, Omyacarb 5GU), based on the solid fraction of the dispersion.

TABLE 1

| Powder composition | | |
|---|---|---|
| Example | Dispersion | Protective colloid (% = wt % of protective colloid, based on the polymeric fraction of the dispersion) |
| 1 | A | 6% PC 1 |
| 2 | A | 3% PC1, 1.5% PC2, 1.5% PC3 |
| 3 | B | 6% PC 1 |
| 4 | B | 3% PC1, 1.5% PC2, 1.5% PC3 |
| 5 | C | 6% PC 1 |
| 6 | C | 3% PC1, 1.5% PC2, 1.5% PC3 |
| C7 (comp. ex.) | A | 6% PC 4 |

Testing:

The powders obtained were each investigated for their powder properties and for processing in a grout.

Determination of the Blocking Score:

To determine the blocking resistance, the dispersion powder was introduced into an iron tube with screw closure, and then loaded with a metal die. The powder was stored under loading in a drying cabinet at 50° C. for 16 hours. After cooling to room temperature had taken place, the powder was removed from the tube and the blocking stability was determined qualitatively by crushing of the powder. The blocking stability was classed as follows:

1=very good blocking stability, no caking
2=good blocking stability
3=satisfactory blocking stability
4=not stable to blocking, powder no longer free-flowing after crushing.

Determination of the Settling Behavior (Tube Settling):

The settling behavior of the redispersion serves as a measure of the redispersibility of the powder. The redispersions were produced using the respective dispersion powders at 50 wt % in water through exposure to strong shearing forces. The settling behavior was then determined in each case with the diluted redispersions (0.5 wt % solids content). 100 ml of each of these redispersions were introduced into a graduated tube and the settling height of solid was measured. The figure is reported in mm settling after 1 hour and after 24 hours. Figures of greater than 1 mm after 1 hour and figures of greater than 3 after 24 h indicate inadequate redispersion of the polymer powder.

The results of the testing of the blocking score and of the tube settling of the dispersion powders are summarized in table 2.

TABLE 2

Powder properties

| Example | Chloride content (wt % in the cationic PC/in the polymer composition) | Blocking score | Tube settling after 1 h | Tube settling after 24 h |
| --- | --- | --- | --- | --- |
| 1 | 4.4/0.26 | 2 | 0.8 | 1.9 |
| 2 | 4.4/0.13 | 1.5 | 0.3 | 0.9 |
| 3 | 4.4/0.26 | 2.5 | 0.2 | 1.0 |
| 4 | 4.4/0.13 | 2.5 | 0.2 | 0.7 |
| 5 | 4.4/0.23 | 2 | 0.2 | 0.9 |
| 6 | 4.4/0.13 | 1.5 | 0.2 | 0.7 |
| C7 (comp. ex.) | 22.0/1.32 | 3 | 1.0 | 1.8 |

For the production of a cementitious grout, the following formula was employed:

| | |
| --- | --- |
| Silica sand | 665 parts |
| Portland cement | 50 parts |
| Cellulose | 5 parts |
| Dispersion powder | 280 parts |
| Water | 400 parts |

The tensile bond strength (TBS) in the assembly was tested in each case after the following storage conditions (DIN CEN 1897):

28 days' standard-conditions storage at 23° C. and 50% atmospheric humidity (28 d SC)=dry, 7 days' standard-conditions storage and 21 days' water storage at 23° C. (7 d SC+21 d water)=wet Testing took place in accordance with EN 1348. For this purpose the mortar was applied to a concrete plate using a stencil (50 mm diameter, 10 mm thickness) in each case, and the test specimens were stored as indicated above. Thereafter, using epoxide adhesive, metal tensile anchors were adhered to the mortar layer under test, in order to carry out the tensile adhesion test. This test took place using a pull-off apparatus from Herion, with a load increase rate of 250 N/s. The measured values in $N/mm^2$ represent average values from 5 measurements.

The determination of the tensile strength (TS) and of the tensile elongation (TE) from the tensile test took place using a standard specimen 3 (1B) according to DIN ISO 527 with a pulling speed of 50 ram/min, in each case after 28 days' standard-conditions storage at 23° C. and 50% atmospheric humidity (28 d SC)=dry,
7 days' standard-conditions storage and 21 days' water storage at 23° C. (7 d SC+21 d $H_2O$)=wet The results for the tensile adhesive strength ("TBS") in the assembly, tensile strength ("TS"), and tensile elongation ("TE") are reproduced in table 3.

TABLE 3

Performance properties in the grout

| Example | TBS dry (N/mm²) | TBS wet (N/mm²) | TS dry (N/mm²) | TS wet (N/mm²) | TE dry (%) | TE wet (%) |
| --- | --- | --- | --- | --- | --- | --- |
| 1 | 1.57 | 1.01 | 1.30 | 0.40 | 42.9 | 9.6 |
| 2 | 1.96 | 1.18 | 1.67 | 0.43 | 52.6 | 13.2 |
| 3 | 1.52 | 1.05 | 1.22 | 0.37 | 51.2 | 11.4 |
| 4 | 1.68 | 1.12 | 1.63 | 0.39 | 45.0 | 14.8 |
| 5 | 1.55 | 1.10 | 1.25 | 0.38 | 55.3 | 15.7 |
| 6 | 1.87 | 1.18 | 1.62 | 0.41 | 51.7 | 15.1 |
| C7 (comp. ex.) | 1.36 | 0.77 | 1.2 | 0.22 | 39.8 | 6.2 |

The results for the examples given show that by using low-halide, cationic protective colloids, polymer powders are obtained which are stable to blocking and are readily redispersible in water (table 2). Surprisingly it was found that, moreover, the polymer powder compositions of the invention produce improved mechanical properties: comparison of example 1 and comparative example 7 in table 3.

The improved mechanical properties are evident in particular after wet storage. A further improvement is obtained with a combination of low-halide cationic protective colloid and polyvinyl alcohol as drying aid: comparison of example 1 and example 2.

The invention claimed is:

1. A process for producing a water-redispersible polymer powder composition having cationic functionality, comprising radically polymerizing one or more ethylenically unsaturated monomers in the presence of a protective colloid and/or emulsifier in an aqueous medium, and drying the resulting aqueous polymer dispersion after addition of a cationic protective colloid as a drying aid, wherein the cationic protective colloid comprises homopolymers or copolymers of one or more cationic monomers having a quaternary ammonium halide group, with 50 wt % to 100 wt % of halide ions in the quaternary ammonium halide groups having been replaced by nonhalide anions, and with the fraction of halide ions being less than 1 wt %, based on the total weight of the polymer powder composition.

2. The process of claim 1, wherein at least one cationic protective colloid comprises homopolymers or copolymers of one or more cationic monomers selected from the group consisting of diallyldimethylammonium chloride, diallyldiethylammonium chloride, (3-methacryloyloxy)propyltrimethylammonium chloride, (2-methacryloyloxy)ethyltrimethylammonium chloride, (3-methacrylamido)propyltrimethylammonium chloride.

3. The process of claim 1, wherein at least one cationic protective colloid comprises at least 10 wt % of monomer units having a quaternary ammonium halide group, based on the total weight of the cationic protective colloid.

4. The process of claim 2, wherein at least one cationic protective colloid comprises at least 10 wt % of monomer units having a quaternary ammonium halide group, based on the total weight of the cationic protective colloid.

5. The process of claim 1, wherein 80 to 100 wt % of the halide ions, based in each case on the total weight of the halide ions in the cationic protective colloid, have been replaced by nonhalide anions.

6. The process of claim 2, wherein 80 to 100 wt % of the halide ions, based in each case on the total weight of the halide ions in the cationic protective colloid, have been replaced by nonhalide anions.

7. The process of claim 3, wherein 80 to 100 wt % of the halide ions, based in each case on the total weight of the halide ions in the cationic protective colloid, have been replaced by nonhalide anions.

8. The process of claim 1, wherein the drying aid is used in an amount of 0.1 to 20 wt %, based on the weight of the polymeric constituents of the dispersion.

9. The process of claim 1, wherein the cationic protective colloid is used as a sole drying aid.

10. The process of claim 1, wherein a combination comprising a cationic protective colloid and nonionic protective colloid is used, the combination having a weight ratio of cationic protective colloid to nonionic protective colloid of 90:10 to 10:90.

11. The process of claim 1, wherein the aqueous polymer dispersion is prepared from monomers comprising one or more ethylenically unsaturated monomers selected from the group consisting of vinyl esters of unbranched or branched alkyl carboxylic acids having 1 to 15 C atoms, methacrylic esters of alcohols having 1 to 15 C atoms, acrylic esters of alcohols having 1 to 15 C atoms, vinylaromatics, olefins, dienes, and vinyl halides.

12. A water-redispersible polymer powder composition having cationic functionality, produced by the process of claim 1.

13. A construction adhesive, render, filling compound, floor-filling compound, leveling compound, grout, jointing mortar, or paint, comprising the water-redispersible polymer powder composition having cationic functionality prepared by the process of claim 1.

* * * * *